United States Patent Office 3,535,269
Patented Oct. 20, 1970

3,535,269
CATALYST COMPOSITIONS FOR
POLYMERIZING ETHYLENE
Sanae Tanaka, Keiji Kamagata, Akiya Nakamura, Kiyoshi Mabuchi, Suji Nishimura, and Etsuro Kubo, Kawasaki, Kanagawa, Japan, assignors to Mitsubishi Petrochemical Co., Ltd., Tokyo, Japan
No Drawing. Filed Mar. 28, 1967, Ser. No. 626,389
Claims priority, application Japan, Apr. 9, 1966, 41/22,356; July 9, 1966, 41/44,706
Int. Cl. C08d 3/04; C08f 15/04
U.S. Cl. 252—429
3 Claims

ABSTRACT OF THE DISCLOSURE

This invention provides a novel catalyst composition comprising organoaluminium compound and vanadium compound, said organoaluminium compound being obtained by reacting alkylaluminium sesquihalide of the general formula:

$$Al_2R_3X_3$$

wherein R represents hydrogen, alkyl or cycloalkyl group having 1 to 8 carbon atoms and X represents halogen, with organic hydroxy compounds.

BACKGROUND OF THE INVENTION

Field of the invention

This invention relates to a novel catalyst composition useful in producing polyethylene, copolymers of ethylene and other α-olefins, or terpolymers of ethylene, other α-olefins and dienes or trienes.

More particularly, it relates to a provision of a novel catalyst composition which is useful for an efficient production of polyethylene or ethylene-containing copolymers or terpolymers and which has a good stability at higher temperatures.

Description of the prior art

Various Ziegler-Natta type catalysts are known heretofore as polymerization catalyst for ethylene and α-olefins.

Summary of the Invention

An object of this invention is to provide a novel catalyst composition for the polymerization of ethylene, and the copolymerization of ethylene and α-olefins.

It has now been found that the object of this invention is accomplished by bringing organoaluminium compounds obtained by reacting alkylaluminium sesquihalide of the general formula:

$$Al_2R_3X_3$$

wherein R represents hydrogen, alkyl or cycloalkyl group having 1 to 8 carbon atoms and X represents halogen, with organic hydroxy compounds having not more than 10 carbon atoms in an amount of 0.5–2 mols per mol of alkylaluminium sesquihalide, into contact with vanadium compounds.

Alkylaluminium sesquihalide which is one of the components of catalyst composition of this invention is represented by the general formula:

$$Al_2R_3X_3$$

wherein R represents hydrogen, alkyl or cycloalkyl group having 1 to 8 carbon atoms and X represents halogen, and among these are particularly preferable ethylaluminium sesquichloride, propylaluminium sesquichloride and isobutylaluminium sesquichloride.

Organic hydroxy compounds which may be reacted with alkylaluminium sesquihalide in the preparation of catalyst composition of this invention include acyclic monohydric or polyhdric alcohols having 1 to 10 carbon atoms and monohydric or polyhydric phenols. Typical examples are methanol, ethanol, propanol, butanol, hexanol, cyclohexanol, ethylene glycol, propylene glycol and phenol.

Although the mechanism of reaction of the above-mentioned alkylaluminium sesquihalides with the above-mentioned organic hydroxy compounds has not been clearly understood, applicants are convinced that an organoaluminium sesquihalide $Al_2R_{3-n}(OR')_nX_3$ is formed as a result of the abovementioned reaction, and a catalyst composition of this invention having an excellent catalytic property is obtained by the reaction of vanadium compounds therewith. In the above formula for the organoaluminium sesquihalide, OR' is a residue of said organic hydroxy compound, R has the meaning given above, and $n$ is a number from 0.5 to 2. However, this invention is not restrained by any particular theory.

The amount of organic hydroxy compounds used is preferably 0.5–2 mols per mol of alkylaluminium sesquihalide and, particularly, the use of about one mol per mol of alkylaluminium sesquihalide gives the most satisfactory result. Departure of the amount from the range mentioned above leads to the decrease in yield of the desired polymers.

Vanadium compound which is the other component of catalyst composition of this invention is a compound of the general formulae: $VX_4$ or $VOX_3$ wherein X represents halogen, alkyl, cycloalkyl or alkoxy group having 1 to 8 carbon atoms, and X may be the same or different, or these may be present together as in mono- or dihalovanadate. These compounds preferably include vanadium tetrachloride, vanadyl trichloride, vanadic ester $VO(OR)_3$, mono- or dichlorovanadate $VO(OR)_2Cl$ or $VO(OR)Cl_2$ and vanadyl tribromide.

The molor ratio of organo aluminium compound to vanadium compound is 0.5–50, and most preferably 2–20.

In preparing the catalyst composition of this invention, no particular restriction is imposed on the method of preparing the same except that the molar ratio of alkylaluminium sesquihalide to organic hydroxy compound is to be adjusted within a certain specific range as stated above.

The method of preparation of the catalyst composition will become apparent from the descriptions of the examples described hereinafter. However, in general, it is carried out in the following manner:

In hydrocarbon solvent such as n-heptane is dissolved alkylaluminium sesquihalide, e.g. ethylaluminium sesquichloride in a vessel blanketed with an inert gas such as argon. Then, organic hydroxy compound, e.g. ethanol, is added thereto dropwise, and a vigorous exothermic reaction is effected with the generation of ethane gas.

In order to control the heat generated by the reaction and to proceed the reaction slowly, it is desirable to cool the reaction system or to decrease the concentration of alkylaluminium sesquihalide in the hydrocarbon solvent mentioned above.

Although normally the reaction of alkylaluminium sesquihalide with organic hydroxy compound is conducted quite easily, it is desirable to heat the reaction mixture at 50°–60° C. in order to complete the reaction. The completion of the reaction is confirmed by the termination of generation of ethane gas.

After the completion of the reaction, solvent is distilled off to give an organoaluminium compound having a composition of $Al_2(R)_2(OR')X_3$, produced as a result of the reaction of alkylaluminium sesquihalide with organic hydroxy compound.

In preparing the catalyst composition of this invention by bringing organoaluminum compound thus obtained into contact with vanadium compound which is the other component of the present catalyst composition, any conventional methods used in the preparation of so-called Ziegler-Natta type catalyst may be readily applicable.

As noted above, the catalyst composition of this invention is prepared by reacting alkylaluminium sesquihalide with organic hydroxy compound, and then combining the resulting organoaluminium compound with vanadium compound, and it is an essential requisite in the preparation of the catalyst composition of this invention that organic hydroxy compound such as alcohol is reacted with alkylaluminium sesquihalide beforehand.

Thus, the catalyst composition of this invention is essentially different from the co-existence of alkylaluminium sesquihalide, alcohol and vanadium compound as three catalyst components, or the combination catalyst of organoaluminium compound and a reaction product obtained by reacting vanadium compound with alcohol.

The feature of the catalyst composition of this invention resides in that the catalyst activity is not lost even at higher temperatures than 50° C. as compared with catalyst compositions comprising organoaluminium compound and vanadium compound.

The catalyst composition of this invention is particularly useful in the polymerization of ethylene to produce powdered polyethylene having a high bulk density, or in the copolymerization of ethylene and α-olefins to produce copolymers having a slight crystallinity, or in the copolymerization of ethylene and α-olefins, or, ethylene, α-olefins and dienes to produce elastomers.

These processes are explained more in detail in the following:

(A) Polymerization of ethylene.—The process for producing polyethylene using catalyst composition of this invention brings about remarkable increase not only in bulk density of the product polyethylene but also in the yield as compared with the prior art processes using alkylaluminium sesquichloride or a combination of monoalkylaluminium dichloride and vanadium compound as a catalyst.

However, since no massive polymer is formed in the polymerization using catalyst composition of this invention but the product is obtained in the form of powder free from stickiness, thus, the inconveniences such as sticking of polymer to inside wall of the reactor and the gelation of polymer are avoided and the transportation of the reaction product becomes much easier.

In practising the polymerization using catalyst composition of this invention, the conventional methods for producing high molecular weight solid polymers are readily applicable.

The polymerization is effected by bringing ethylene into contact with the catalyst composition in an inert solvent.

Inert solvents which may be used in the process of this invention include aliphatic, acyclic, aromatic hydrocarbons and halogenated hydrocarbons, which are substantially free from impurities having poisoning effect on the catalyst composition such as water. Typical examples preferably include hexane, heptane, octane, cyclohexane, benzene, toluene, chlorobenzene and dichloroethane.

The polymerization temperature and pressure are not critical. However, in general, a temperature of from −20° to 100° C., and a pressure of from normal to 100 atmospheres are preferable.

High molecular weight solid polymers of ethylene obtained by using catalyst composition of this invention have useful properties similar or superior to those of polymers obtained by the conventional low pressure polymerization of ethylene and they are suitably used for the production of fibers, plastics and films.

(B) Copolymerization of ethylene and α-olefins.—Copolymers having 70–95% by weight of ethylene and slight crystallinity may be obtained by copolymerizing a mixture consisting of ethylene and α-olefin in the presence of the catalyst composition of this invention.

In producing such copolymers by using catalyst compositions known heretofore, there is a disadvantage in that a part of the produced copolymer having a slight crystallinity is precipitated in the course of the reaction due to its poor solubility in the solvent used, thus, the reaction mixture forms heterogeneous reaction system which impedes a complete copolymerization reaction.

As a result, only a copolymer having non-uniform composition and a broad molecular weight distribution is obtained.

Hence, it has been confirmed that in order to obtain a copolymer having uniform composition and a narrow molecular weight distribution free from such disadvantage mentioned above, the use of an inert solvent capable of dissolving the produced copolymer completely at the reaction temperature employed is essential.

As described above, the selection of proper type of solvent and the reaction temperature capable of completely dissolving the produced copolymer is an indispensable requisite in obtaining a copolymer having a narrow molecular weight distribution.

However, the above-mentioned copolymer is difficultly dissolved into aliphatic, acyclic, aromatic hydrocarbons or halogenated hydrocarbons which are usually used as polymerization solvent at a normal temperature or its vicinity. Even if it is dissolved, the viscosity of the solution is so high that it is impossible to conduct a homogeneous reaction. Thus, so long as these solvents as mentioned above are used, it is necessary, that the polymerization temperature is at least above 50° C. in order to keep the product in the form of a solution.

However, although olefin copolymerization catalysts known heretofore are effective at normal temperature or its vicinity, the catalyst activities are very often lost when the polymerization temperature is raised above 50° C. For example, the catalyst activity of $Al_2R_3X_3$—$VOCl_3$ catalyst, which is an excellent copolymerization catalyst, is completely lost at temperatures above 50° C. In this instance, the catalyst solution has initially a uniform purple color at about a normal temperature, and as the temperature is raised, the color gradually fades away and it disappears completely at temperatures above 50° C. It is presumed, therefore, that the catalyst complex is decomposed at a high temperature.

We have found that the catalyst composition of this invention is not decomposed at polymerization temperature of above 50° C., and a smooth copolymerization reaction can be proceeded even at such high temperatures.

Now the copolymerization reaction at higher temperatures is made possible by the use of the catalyst composition of this invention, and as a result, there are brought about advantages in that the copolymers having narrow molecular weight distribution are obtained; that the solubility of the produced copolymer per unit amount of solvent is increased; that the use of expensive refrigerator for controlling reactor temperature may be avoided and that the stirring becomes easier due to the reduced viscosity.

In practising the copolymerization reaction by using the catalyst composition of his invention, the reaction conditions and operations may be substantially the same as those employed in the conventional copolymerization of ethylene known heretofore, and it may be conducted under normal or an elevated pressure. The polymerization temperature is preferably from 50° C. to 150° C.

Solvents which may be preferably used in the present process include aliphatic, acyclic, aromatic or halogenated hydrocarbons such as hexane, heptane, octane, nonane, benzene, toluene, xylene, chlorobenzene, dichlorobenzene, tetrachloroethane and tetraline.

Since the copolymerization is conducted at relatively higher temperatures in the preferred embodiments of this invention, it is necessary to use a high pressure sufficient to maintain the solvent in a liquid phase at such high temperature being employed.

Olefinic monomers which may be copolymerized in the presence of the catalyst composition of this invention include propylene, butene, pentene, hexene, octene, styrene, butadiene and isoprene.

(C) Copolymerization of ethylene and α-olefin, or ethylene, α-olefin and diene or triene.—Elastomeric copolymers and terpolymers having excellent properties and substantially free from crystallinity may be obtained by copolymerizing ethylene and α-olefin or terpolymerizing ethylene, α-olefin and diene or triene in the presence of the catalyst composition of this invention while maintaining a high catalyst actvity.

In the present polymerization reaction, the same reaction conditions as in the polymerization of ethylene and α-olefin described above may be used except that the polymerization temperature is from −30° to 150° C., and most preferably from 0° to 60° C.

α-Olefins which may be copolymerized with ethylene in the process of this invention are compounds of the general formula $$R'—CH=CH_2$$

wherein R' represents alkyl group having 1 to 8 carbon atoms, and these compounds preferably include propylene, butene-1, pentene-1, hexene-1, heptene-1, decene-1, 4-methyl-pentene-1, 4-methylhexene-1, and 3-butylbutene-1.

Dienes and trienes which may be used to introduce unsaturated bond into copolymer or terpolymer include the following:

(1) Tetrahydroindene having a chemical structure:

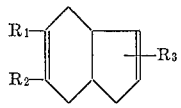

wherein $R_1$, $R_2$ and $R_3$ represent hydrogen, alkyl or alkenyl group, which may be the same or different, and derivatives thereof. Typical examples: dimethyltetrahydroindene, diethyltetrahydroindene, di-n-propyltetrahydroindene, methylethyltetrahydroidinene, 5 (or 6)-(4'-methyl-Δ-pentenyl)-tetrahydroindene.

(2) Dicyclopentadiene.

(3) Aliphatic dienes of the formula:

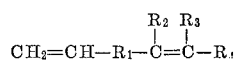

wherein $R_1$ represents alkylene group, $R_2$ and $R_3$ represent hydrogen or alkyl group which may be the same or different. Typical examples: 1,4-hexadiene, 1,9-octadecadiene, 6-methyl-1,5-heptadiene, 7-methyl-1,6-octadiene, 11-ethyl-1,11-tridecadiene, 9-ethyl-1,9-undecadiene, 7-ethyl-1,7-nonadiene, 8-propyl-1,8-undecadiene, 8-ethyl-1,8-decadiene, 10-ethyl-1,9-dodecadiene, 12-ethyl-1,12-tetradecadiene, 13-n-butyl-1,12-heptadecadiene, 15-ethyl-1,15-heptadecadiene.

(4) 5-alkenyl-substituted-2-norbornenes. Typical examples: 5-vinyl-2-norbornene, 5-propenyl-2-norbornene, 5-(2'-ethyl-2'-butenyl)-2-norbornene, 5-(2'-ethyl-1'-buten-2-norbornene, 5-(2'-methyl-1'-propenyl)-2 - norbornene, 5-(2'-propenyl-2'-pentenyl)-2-norbornene, 5-(2'-butyl-2'-pentenyl)-2-norbornene, 5-(2'-methyl-1'-butenyl)-2 - norbornene, 5-(2'-methyl-1'-undecenyl)-2-norbornene.

(5) 2-alkyl-2,5-norbornadienes. Typical examples: 2-methyl-2,5-norbornadiene, 2-butyl-2,5-norbornadiene, 2-octyl-2,5-norbornadiene.

(6) Alkenylcycloalkenes. Typical example: 4-vinylcyclohexene.

(7) Cyclodienes. Typical examples: cyclopentadiene, cyclohexadiene, cyclooctadiene, methycyclopentadiene.

(8) Aliphatic trienes. Typical examples: 1,3,5-hexatriene, 2,6-dimethyl-1,5,7-octatriene, 2-methyl-6-methylene-2,7-octatriene, 2,6-dimethyl-2,4,6-octatriene, 2-methyl-1,3,5-hexatriene.

Binary or ternary elastomeric copolymers or terpolymers having about 20–70% by weight of recurring ethylene unit (—$CH_2$—$CH_2$—) obtained by using catalyst composition of this invention are suitable for various uses, and particularly, ones having 30–65% by weight of ethylene are preferable. Interpolymers, ones having 0.5–20% by weight of double bonds are preferable.

Elastomeric copolymers or terpolymers obtained according to this invention may be cross-linked by using conventional cross-linking agent to produce synthetic rubbers having comparable properties to those of rubbers known heretofore.

The following examples will serve to illustrate this invention more fully. However, it should not be construed that these examples restrict this invention as they are given merely by way of illustration.

DESCRIPTION OF THE PREFERRED EMBODIMENTS

(A) Polymerization of Ethylene

Example 1

(a) Preparation of organoaluminium compound (reaction of $Al_2(C_2H_5)_3Cl_3$ with $C_2H_5OH$).—In 100 ml. of n-heptane was dissolved 24.7 g. (0.1 mol) of ethylaluminium sesquichloride $Al_2(C_2H_5)_3Cl_3$ under a blanket or argon gas in 300 ml. glass flask provided with a thermometer, stirrer and a dropping funnel.

To the resulting solution which was cooled by Dry Ice-methanol at −78° C., was charged 4.6 g. (0.1 mol) of ethanol dropwise through the dropping funnel with stirring, and a vigorous exothermic reaction was carried out with the generation of ethane gas.

After carefully dropping ethanol so as to maintain the temperature at below −70° C., the reaction mixture was then heated at 60° C. to complete the reaction, and thereafter, n-heptane was distilled off under a reduced pressure.

An analysis of organoaluminium compound thus obtained revealed that it contained 0.09 mol of ethyl group per mol of aluminium and 1.51 mol of chlorine per mol of aluminium.

It was concluded from the results that the organoaluminium compound obtained had a composition of $Al_2(C_2H_5)_2(OC_2H_5)Cl_3$.

(b) Polymerization of ethylene.—To a liter glass flask provided with a thermometer, a stirrer and an inlet and an outlet for gas were charged 500 ml. of dehydrated n-heptane, 3.14 g. (0.012 mol) of organoaluminium compound $Al_2(C_2H_5)_2(OC_2H_5)Cl_3$ obtained by the preparation (a) mentioned above, and 0.69 g. (0.004 mol) of vanadium oxytrichloride $VOCl_3$ under a blanket of argon gas at 20° C., and the reaction was carried out for 30 minutes with stirring to prepare a catalyst composition. The reaction mixture was coloured in dark purple.

Thereafter, ethylene which was dehydrated by passing through a silica gel tower and a molecular sieve tower was introduced to the flask through the gas inlet at a flow rate of about 1 liter per minute, and the polymerization reaction was conducted with vigorous stirring. Although the temperature in the flask was raised by the polymerization heat, the temperature was carefully adjusted at 20°–30° C. by cooling.

After the polymerization was carried out for 90 minutes, the introduction of ethylene gas was suspended and the catalyst was decomposed by adding 20 ml. of butanol.

The product polymer was refluxed with 500 ml. of 1 N aqueous hydrochloric acid-butanol for 4 hours to remove catalyst therefrom, and then the polymer was filtered off followed by drying at 55° C. under a reduced pressure for 12 hours. As a result, 78 g. of white powdered polyethylene was obtained.

The polyethylene had a bulk density of 0.13 g./cm.³ and an intrinsic viscosity η of 12.0 as measured in tetraline solution at 130° C. Methyl branch as determined by an infrared absorption spectrum at 7.254μ was 0.5 unit per 1000 unit of carbon atoms. The content of massive polymer in the polyethylene was less than 1%.

Example 2

(a) *Preparation of organoaluminium compound (reaction of $Al_2(C_2H_5)_3Cl_3$ with $C_4H_9OH$).*—To a 1 liter glass flask provided with a thermometer, a stirrer and an inlte and an outlet for gas were charged 500 ml. of dehydrated n-heptane, and 2.97 g. (0.012 mol) of ethylaluminium sesquichloride, under a blanket of argon gas.

To the resulting solution which was cooled at —78° C. by Dry Ice-methanol bath was carefully added 0.89 g. (0.012 mol) of n-butanol dropwise with stirring, and a vigorous exothermic reaction was conducted with the generation of ethane gas. Thereafter, the reaction mixture was stirred for 30 minutes at room temperature.

(b) *Polymerization of ethylene.*—To the resulting solution containing organoaluminium compound obtained in the above-mentioned (a) which was maintained at 20° C., was added 0.69 g. (0.004 mol) of vanadium oxytrichloride $VOCl_3$ and stirred for 30 minutes to prepare a catalyst composition. The reaction mixture was coloured in dark purple.

Thereafter, the polymerization of ethylene was conducted according to the same procedures as described in Example 1, and as a result, 50 g. of white powdered polyethylene was obtained.

The polyethylene had a bulk density of 0.15 g./cm.$^3$, and an intrinsic viscosity $\eta$ of 7.7. Methyl branch was less than 0.5 unit per 1000 units of carbon atoms, and the content of massive polymer was less than 1%.

(B) Copolymerization of Ethylene and α-Olefins

The following Examples 3 and 4 are controls outside this invention.

Example 3

To a 500 ml. reactor provided with a stirrer, a reflux condenser, an inlet and an outlet for monomeric gas and a thermometer was charged 250 ml. of heptane under nitrogen stream, and, while maintaining the temperature at 10° C., a gaseous mixture consisting of ethylene and propylene in a ratio of 1:2 was introduced thereinto at a flow rate of 3 l./min. under normal pressure and absorbed until saturation in the solvent. When 1.5 mmols of ethylaluminium sesquichloride and 0.5 mmol of vanadium oxytrichloride $VOCl_3$ were added thereto subsequently in order, the solution was coloured in purple and the polymerization was started at once.

After a lapse of 30 minutes thereafter, the catalyst was deactivated by adding 50 ml. of methanol, the solvent was recovered by distillation with steam and the resulting elastomer was dried at 50° C. under a reduced pressure for 48 hours. The yield of the elastomer was 16.0 g. and propylene content in the copolymer was determined as 56% by an infrared absorption analysis.

Example 4

Example 3 was repeated according to the same procedures as described therein except that the polymerization reaction was carried out at 70° C. As a result, the yield of the product copolymer was 0.8 g.

Example 5

This example illustrates a process for producing ethylene-propylene copolymer having less propylene content and shows that a higher polymerization temperature is suitable in obtaining copolymers having narrow molecular weight distribution.

To a 1 liter reactor were charged 500 ml. of n-heptane, 3.5 mmols of ethylaluminium sesquichloride and absolute ethanol, and after a lapse of 5 minutes, 0.6 mmol of vanadium oxytrichloride $VOCl_3$ was added further thereto, then, a gaseous mixture consisting of ethylene and propylene in a ratio of 2:1 was introduced thereto and the polymerization reaction was carried out for 30 minutes.

The physical properties of the product copolymers obtained at the polymerization temperatures of 10° C. and 70° C. are compared in the following table. The yield referred to in the table indicates the proportion of the amount of copolymer obtained to the amount of monomer gas consumed.

| Polymerization temperature (degrees C.) | Yield (percent) | Propylene content (wt. percent) | Tensile strength (kg. cm.$^2$) | Elongation (percent) | Ether extract (percent) | Transparency |
|---|---|---|---|---|---|---|
| 10 | 43 | 28 | 59 | 850 | 16 | Bad. |
| 70 | 80 | 25 | 145 | 1,059 | 6 | Good. |

Even in copolymer polymerized at 10° C., the physical properties of ether extraction residue are improved, for example, the tensile strength is increased to 130 kg./cm.$^2$ and the transparency is also improved. for example, the transparency is also improved. Thus, it is noted that the narrowing of composition and molecular weight distribution is desirable and necessary.

Example 6

To the same equipment as used in Example 3 were charged 250 ml. of chlorobenzene as a solvent, 1.5 mmols of butylaluminium sesquichloride, 0.5 mmol of isobutanol and 0.5 mmol of vanadium tetrachloride, and while maintaining the temperature at 70° C., a gaseous mixture consisting of ethylene and propylene in a ratio of 3:1 was introduced thereto for 30 minutes and the polymerization was conducted.

As a result, 14.5 g. of copolymer having a uniform composition was obtained.

Example 7

To the same equipment as used in Example 3 were charged 250 ml. of xylene as a solvent, 1.5 mmols of ethylaluminium bromide, 1 mmol of ethylene glycol and 0.5 mmol of ethyl vanadate, then, a gaseous mixture consisting of ethylene and butene in a ratio of 4:1 was introduced thereinto for 30 minutes at 80° C. and copolymerization was conducted.

As a result, 14 g. of copolymer having butene-1 content of 12% by weight was obtained.

(C) Copolymerization of Ethylene and α-Olefin and Terpolymerization of Ethylene, α-Olefin and Diene or Triene The following Examples 8 and 9 are controls showing the use of catalyst compositions outside this invention.

Example 8

To a 1 liter glass flask provided with a thermometer, a stirrer and an inlet and an outlet for monomer gas was charged 500 ml. of dehydrated n-heptane, and a gaseous mixture consisting of ethylene and propylene in a molar ratio of 1:2 was introduced thereinto through the inlet and absorbed until the saturation in n-heptane, while overflowing the surplus gas from the outlet.

Then, there were added 0.4 g. (1.5 mmols) of ethylaluminium sesquichloride $Al_2(C_2H_5)_3Cl_3$ and 0.08 g. (0.5 mmol) of vanadyl trichloride, and the polymerization was carried out at 0° C. under normal pressure with vigorous stirring.

After the reaction was carried out for 30 minutes, the introduction of gas was terminated and the catalyst was deactivated by adding 20 ml. of n-butanol and 1 ml. of trinonylphenylphosphite.

After washing was repeated three times with each portion of 100 ml. of water, solvent was distilled off from the product copolymer by stripping and dried at 60° C. for 24 hours under a reduced pressure. As a result, 15.1 g.

of the product copolymer having propylene content of 57% by weight was obtained.

Example 9

Example 8 was repeated according to the same procedures as described therein except that the polymerization temperature of 60° C. was used instead of 0° C. As a result, the yield of product was 3.1 g. and propylene content of the product copolymer was 51% by weight.

Example 10

Example 8 was repeated according to the same procedures as described therein except that 0.39 g. of reaction product obtained by a reaction of equimolar amounts of $Al_2(C_2H_5)_3Cl_3$ with ethanol $C_2H_5OH$ was used in place of ethylaluminium sesquichloride.

As a result, the yield was 27.5 g. and propylene content of the product copolymer was 59% by weight.

Example 11

Example 10 was repeated according to the same procedures as described therein except that the polymerization temperature of 60° C. was used instead of 0° C.

As a result, the yield of the product copolymer was 6.2 g. and propylene content was 49% by wieght.

Example 12

Example 10 was repeated according to the same procedures as described therein except that n-hexanol was used in place of ethanol.

As a result, the yield of the product was 20.1 g. and propylene content was 52% by weight.

The results of Examples 8–12 are summarized in the following table.

| Example No. | Type of catalyst | Polymerization temp. (° C.) | Yield (g.) | Propylene content (wt. percent) |
|---|---|---|---|---|
| 8 | $Al_2(C_2H_5)_3Cl_3VOCl_3$ | 0 | 15.1 | 57 |
| 9 | $Al_2(C_2H_5)_3Cl_3VOCl_3$ | 60 | 3.1 | 51 |
| 10 | $[Al_2(C_2H_5)_3Cl_3+C_2H_5OH]VOCl_3$ | 0 | 27.5 | 59 |
| 11 | $[Al_2(C_2H_5)_3Cl_3+C_2H_5OH]VOCl_3$ | 60 | 5.2 | 49 |
| 12 | $[Al_2(C_2H_5)_3Cl_3+n-C_6H_{13}OH]VOCl_3$ | 0 | 20.1 | 52 |

It can be noted from the above that the catalyst composition of this invention has a remarkable catalyst activity.

Example 13

Example 10 was repeated according to the same procedures as described therein except that the polymerization temperature of 30° C. was used instead of 0° C. and 3 ml. of methyltetrahydroindene was added before charging aluminium compound.

As a result, 27.0 g. of rubber-like copolymer containing 1.4% by weight of double bond as determined by titration method of iodine value and having propylene content of 57% by weight was obtained.

Example 14

Example 13 was repeated according to the same procedures as described therein except that 2 ml. of dicyclopentadiene was used in place of methyltetrahydroindene.

As a result, 20.2 g. of copolymer containing 1.94% by weight of double bond and having 55% by weight of propylene was obtained.

To the product copolymer were added 1 part by weight of stearic acid, 50 parts by weight of carbon black-SH, 1.5 parts by weight of sulfur, 1.5 parts by weight of tetramethylthiuram disulfide and 0.5 part by weight of dibenzothiazyl disulfide and heated at 150° C. under a pressure of 130 kg./cm.³ for 30 minutes. As a result, an elastomer having a tensile strength at breaking point of 280 kg./cm.², an elongation of 450%, and 300% modulus of 210 kg./cm.² was obtained.

Examples 15–20

Copolymerization reactions were conducted according to the same procedures as described in Example 13 except that the polymerization temperature of 20° C. was used and each portion of 1 ml. of diene or triene compounds as specified below were added. The results are summarized in the following table.

| Example | Type of compound | Yield (g.) | Propylene content (percent) | Double bonds (wt. percent) |
|---|---|---|---|---|
| 15 | 1,4-hexadiene | 20.1 | 53 | 1.0 |
| 16 | 5-vinyl-2-norbornene | 23.0 | 51 | 1.2 |
| 17 | 2-methyl-2,5-norbornadiene | 19.0 | 49 | 1.3 |
| 18 | 4-vinylcyclohexene | 24.1 | 56 | 0.7 |
| 19 | cyclohexadiene | 18.5 | 55 | 0.9 |
| 20 | 2-methyl-6-methylene-2,7-octatriene | 15.2 | 48 | 1.5 |

Example 21

Example 13 was repeated according to the same procedures as described therein except that butene-1 was used in place of propylene.

As a result, 17.4 g. of copolymer containing 0.9% by weight of double bond and having 35% by weight of butene-1 was obtained.

Example 22

Example 13 was repeated according to the same procedures as described therein except that a reaction product obtained by reacting triethylaluminium sequichloride $Al_2(C_2H_5)_3Cl_3$ with ethanol in a molar ratio of 1:2 was used in place of the organoaluminium compound used therein.

As a result, 16.5 g. of copolymer containing 1.2% by weight of double bond was obtained.

What we claim is:

1. A catalyst composition comprising (1) an organoaluminium compound having the formula $$Al_2R_{3-n}(OR')_nX_3$$

wherein R represents a member selected from the group consisting of hydrogen, alkyl and cycloalkyl groups having 1 to 8 carbon atoms, OR' is a residue of an organic hydroxy compound selected from the group consisting of monohydric acyclic alcohol having 1 to 8 carbon atoms and monohydric and polyhydric phenols, $n$ is a number of from 0.5 to 2, and X represents halogen, said organoaluminium compound having been obtained by reacting an alkylaluminium sequihalide having the formula $$Al_2R_3X_3$$

wherein R and X have the above meanings with 0.5 to 2 mols per mol of the alkylaluminium sequihalide of an organic hydroxy compound selected from the group consisting of monohydric acyclic alcohols having 1 to 8 carbon atoms, polyhydric acyclic alcohols having 1 to 8 carbon atoms, and monohydric and polyhydric phenols, and (2) a vanadium compound selected from the group consisting of $VX'_4$ and $VOX'_3$ wherein $X'$ is selected from the group consisting of alkyl, cycloalkyl and alkoxy groups having 1 to 8 carbon atoms, and halogen, the molar ratio of said organoaluminium compound to said vanadium compound being from 0.5 to 5.0.

2. A catalyst composition according to claim 1 wherein said alkylaluminium sesquihalide is a member selected from the group consisting of ethylaluminium sesquichloride, propylaluminium sesquichloride, and isobutylaluminium sesquichloride.

3. A catalyst composition according to claim 1 wherein said vanadium compound is a member selected from the group consisting of vanadium tetrachloride, vanadyl trichloride, vanadic ester, monochlorovanadate, dichlorovanadate and vanadyl tribromide.

References Cited

UNITED STATES PATENTS

| | | |
|---|---|---|
| 3,006,904 | 10/1961 | Jahrstorfer et al. |
| 3,161,628 | 12/1964 | Dost et al. _____ 260—93.7 XR |
| 3,219,652 | 11/1965 | Hill et al. |
| 3,379,701 | 4/1968 | Gladding et al. |

PATRICK P. GARVIN, Primary Examiner

U.S. Cl. X.R.

252—431; 260—88.2, 94.9